(12) United States Patent
Koike et al.

(10) Patent No.: US 7,501,812 B2
(45) Date of Patent: Mar. 10, 2009

(54) COMBINED SENSOR AND BEARING ASSEMBLY AND METHOD OF MAGNETIZING ELEMENT OF ROTATION SENSOR

(75) Inventors: Takashi Koike, Iwata (JP); Tomomi Ishikawa, Iwata (JP); Hiroshi Isobe, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 11/976,618

(22) Filed: Oct. 25, 2007

(65) Prior Publication Data

US 2008/0174305 A1 Jul. 24, 2008

Related U.S. Application Data

(62) Division of application No. 11/092,587, filed on Mar. 29, 2005, now Pat. No. 7,304,471.

(30) Foreign Application Priority Data

Mar. 30, 2004 (JP) ............................. 2004-098368

(51) Int. Cl.
*G01B 7/30* (2006.01)
*H01F 41/02* (2006.01)
*H01F 7/08* (2006.01)

(52) U.S. Cl. ................... 324/207.25; 148/103; 335/229

(58) Field of Classification Search ......... 324/173–174, 324/207.2, 207.25, 251; 335/229, 284, 296, 335/302–306; 384/448; 264/427, DIG. 58; 148/100–101, 103, 105; 29/607; 73/514.31, 73/514.39

See application file for complete search history.

(56) References Cited

U.S. PATENT DOCUMENTS 6,060,970 A * 5/2000 Bell ............................ 335/285
2003/0141774 A1* 7/2003 Komura et al. ......... 310/156.43

FOREIGN PATENT DOCUMENTS

JP 55115306 A * 9/1980

OTHER PUBLICATIONS

Ichiro Tokunaga et al, Patent Abstracts of Japan, "Magnetic Angle Detection Apparatus", Publication No. 08-122011 and Publication Date May 17, 1996.
Yoshio Fujikawa et al., Patent Abstracts of Japan, "Bearing With Absolute Encoder", Publication No. 2004-004028, Publication Date Jan. 8, 2004.
Mamoru Aoki, Patent Abstracts of Japan, "Rolling Bearing With Rotating Condition Detecting Device", Publication No. 2004-020548, Publication Date Jan. 22, 2004.
U.S. Appl. No. 11/092,587, filed Mar. 29, 2005, Takashi Koike et al., NTN Corporation.

* cited by examiner

*Primary Examiner*—Bot LeDynh (57) ABSTRACT

A method of magnetizing a ring-shaped to-be-detected member of a rotation sensor unit, using a magnetizing yoke assembly of a structure having a pair of yoke arms having respective end faces curved arcuately with a space left between those end faces, the method including positioning the to-be-detected member with a ring center thereof aligned with an imaginary line connecting between respective centers of curvature of the curved end faces of the yoke arms, fixing the to-be-detected member with opposite sides of the to-be-detected member spaced an equal distance from the adjacent free end faces and magnetizing the to-be-detected member.

3 Claims, 6 Drawing Sheets

COMBINED SENSOR AND BEARING ASSEMBLY AND METHOD OF MAGNETIZING ELEMENT OF ROTATION SENSOR

CROSS-REFERENCE TO RELATED APPLICATIONS

This application is a divisional of U.S. patent application Ser. No. 11/092,587, filed Mar. 29, 2005, now U.S. Pat. No. 7,304,471, which application is based upon and claims the priority of Japanese Patent Application No. 2004-0983668 filed with the Japanese Intellectual Property Office on Mar. 30, 2004, the disclosures of the foregoing being incorporated herein by reference in their entirety.

BACKGROUND OF THE INVENTION

1. Field of the Invention

The present invention relates to a combined sensor and bearing assembly installed in any of various machines and equipments for detecting the rotation of a rotating mechanism within, for example, a limited range of angle, and a method of magnetizing a rotation sensor unit employed in the combined sensor and bearing assembly.

2. Description of the Related Art

The rotation sensor unit used in the combined sensor and bearing assembly has been well known in the art from, for example, the Japanese Laid-open Patent Publications No. 2004-004028 and No. 2004-20548, in which along with the rotation of a rotatable race two, 90° phase offset sinusoidal outputs are obtained in the form of a sine wave signal and a cosine wave signal so that the tangent value can be obtained from those signals to detect the absolute position of rotation angle of the rotatable race.

Also, irrespective of the bearing, an independent magnetic angle detecting device is known, which includes a magnetic sensor unit of an analog output type mounted on a stationary member and a magnet, which is a to-be-detected member, mounted on a rotating member in face-to-face relation with the magnetic sensor unit so that an analog output proportional to the angle of rotation of the rotating member can be obtained as the to-be-detected member rocks or rotates with the rotating member. See, for example, the Japanese Laid-open Patent Publication No. 8-122011.

It has, however, been found that the system in which the absolute position of the angle of rotation is detected based on the two 90° phase offset sinusoidal outputs, requires the use of an extra signal processing circuit for processing the detection signal. Positioning of the signal processing circuit adjacent the rotation sensor unit is difficult to achieve because of a limited space available and an additional problem is involved in designing in a compact size the machine in which the combined sensor and bearing assembly is incorporated. With the combined sensor and bearing assembly having built therein a sensor for detecting the absolute position, the angle of rotation is often limited to a certain range, for example, not larger than 180°, depending on the condition of use. In this case, there is no need to use the two sensor outputs to detect the angle of rotation.

In the system in which the magnet disposed in face-to-face relation with the magnetic sensor rotates or rotates within a limited range of angle such as the magnetic angle detecting device disclosed in the third mentioned patent publication, in order for the sensor output to exhibit a linear characteristic within a predetermined range of angle of rotation, it is necessary for the magnet to be magnetized to represent as closely a sinusoidal waveform as possible. However, the third mentioned patent publication is silent as to the details of magnetization. Although magnetization with an air-core coil is well known in the art, the magnetic field used therein lacks stability and, therefore, difficulty has been encountered with to magnetize the magnet to represent a magnetic intensity distribution resembling the sinusoidal waveform. Also, what is disclosed in the third mentioned patent publication is a mere magnetic angle detecting device and no rolling bearing assembly for rotatably supporting a shaft member is employed therein and, accordingly, there is a high risk that the precision may lower as a result of a mechanical frictional wear occurring in an insertion hole or the like for the passage of a shaft member of a housing therethrough even though the sensor unit is designed to be of a non-contact type.

SUMMARY OF THE INVENTION

In view of the foregoing, a primary object of the present invention is to provide an improved combined sensor and bearing assembly effective to accomplish a precise detection of the absolute position of the angle of rotation within a limited range of angle and capable of being assembled compact in size.

Another important object of the present invention is to provide a method of magnetizing a to-be-detected member of a rotation sensor unit, which is effective to precisely magnetize the to-be-detected member of the rotation sensor unit.

In order to accomplish the foregoing objects of the present invention, there is in accordance with one aspect thereof provided a combined sensor and bearing assembly, which includes a rolling bearing unit having a rotatable raceway member, a stationary raceway member mounted around the rotatable raceway member with an annular bearing space defined between it and the rotatable raceway member, and a circular row of rolling elements operatively accommodated within the annular bearing space. The combined sensor and bearing assembly also includes a to-be-detected member including a magnet secured to the rotatable raceway member, and a magnetic detector including a magnetic sensor of an analog output type disposed in face-to-face relation with the to-be-detected member. In this combined sensor and bearing assembly, only a range in which a magnetic characteristic of the to-be-detected member relative to the magnetic detector exhibits output linearity is used for detection of rotation angle of the rotatable raceway member.

According to this aspect of the present invention, since only the range in which the magnetic characteristic of the to-be-detected member exhibits output linearity is utilized for the detection of rotation angle of the rotatable raceway member, the absolute position of the rotatable raceway member can be precisely detected within such limited range. It is also possible to use a detection signal, outputted from the magnetic detector, as a limit signal. Since there is no need to use two magnetic detectors for the detection of the absolute position, the compactization of the combined sensor and bearing assembly is possible. Also, since the to-be-detected member and the magnetic detector are mounted on respective raceway members of the rolling bearing unit, the gap between the to-be-detected member and the magnetic detector can be kept uniform in gap size, making it possible to stabilize the detection output. Since a rotation sensor unit including the to-be-detected member and the magnetic detector is integrated together with the rolling bearing unit, the combined sensor and bearing assembly can easily be incorporated in a machine or equipment with a requisite mounting adjustment simplified. Where the rotatable raceway member is an inner race, a rotary shaft can be coupled with the inner race by inserting into a bore of the inner race, resulting in simplification and facilitation of the coupling job.

Preferably, the to-be-detected member may include a ring-shaped magnet and has the magnetic characteristic which periodically change one or more cycles for each complete rotation of the rotatable raceway member.

The magnetic characteristic of the to-be-detected member may have a magnetic intensity distribution of a sinusoidal waveform, in which N- and S-poles alternate with each other.

If the to-be-detected member is magnetized to have a sinusoidal magnetic intensity distribution, it is possible to accomplish the detection with a good output linearity. If the range of rotation angle of the rotatable raceway member is not greater than 180°, the to-be-detected member may be magnetized sinusoidally to have a single pole-pair, but if the rotation angle is extremely limited to a range of tens of angles, the magnetization of the to-be-detected member with the number of pole pairs increased to two, three and so on will result in increase of the detection precision.

The integration of the rolling bearing unit and the non-contact sensor allows the combined sensor and bearing assembly to function as a sort of non-contact potentiometer.

In a preferred embodiment of the present invention, a range of an output from the magnetic detector that is a generally linear range ranging on respective sides of N- and S-poles with respect to a zero point is used for the detection of rotation angle. The zero point is an output value indicating that no magnetic flux has been detected.

If the range in which a substantially linear output can be obtained with the zero point taken as a reference is used, the absolute position can be detected easily within such range.

Preferably, the to-be-detected member may include an isotropic magnet. If the isotropic magnet is used for the to-be-detected member, the magnetic characteristic obtained by magnetization of the to-be-detected member can be so designed as to represent a uniform magnetic distribution with a minimized magnetic noise.

In another preferred embodiment of the present invention, the to-be-detected member and a member enclosing the magnetic detector may be formed with radially oriented first and second phase-alignment holes defined therein, respectively, which are alignable with each other in a radial direction of the combined sensor and bearing assembly. In this case, a fixing jig is removably inserted into the first and second phase-alignment holes to lock the member enclosing the magnetic detector and the to-be-detected member in a position non-rotatable relative to each other. The fixing jig may be, for example, a rod-shaped element.

According to this preferred embodiment, when the combined sensor and bearing assembly is incorporated in a machine or equipment while the fixing jig is kept inserted through the first and second phase-alignment holes, the attendant worker need not perform the phase alignment between the magnetic detector and the to-be-detected member making reference to the detection signal outputted form the magnetic detector and, hence, a requisite adjustment job to be performed during the incorporation of the combined sensor and bearing assembly in the machine or equipment can advantageously be facilitated. The fixing jig may, however, be withdrawn out of the first and second phase-alignment holes to release the to-be-detected member and the magnetic detector rotatable relative to each other, once the combined sensor and bearing assembly has been incorporated in the machine or equipment.

Where the first and second phase-alignment holes are employed as described above, the fixing jig may be fixed to a mounting member for the stationary raceway member to prevent rotation of the stationary raceway member, with the fixing jig disengaged from only the first phase-alignment hole in the to-be-detected member, but remaining engaged within the second phase-alignment hole in the member enclosing the magnetic detector.

In such case, the fixing jig can be concurrently used as a detent means for avoiding the rotation of the rotatable raceway member relative to the stationary raceway member during the incorporation of the combined sensor and bearing assembly in the machine or equipment and as a detent means for locking the stationary raceway member after the incorporation of the combined sensor and bearing assembly in the machine or equipment.

In the combined sensor and bearing assembly of the present invention, the to-be-detected member may include a backing metal having an index such as a projection, a recess or a colored marking formed thereon. A member for fixing the magnetic detector has a surface portion formed with an arcuately extending groove. When the index is aligned with a predetermined lengthwise portion of the arcuately extending groove, the magnetic detector and the to-be-detected member can be matched in phase with each other. The arcuately extending groove may be either a slot open or a through-hole.

Where the index is made to align with the predetermined position of the arcuately extending groove, the phase matching between the to-be-detected member and the magnetic detector can easily and conveniently be accomplished at the time the combined sensor and bearing unit is incorporated in the machine or equipment.

Preferably, a predetermined marking may be provided in a portion of the arcuately extending groove intermediate of a length thereof so that when the predetermined marking is aligned with the index in the to-be-detected member, the magnetic detector and the to-be-detected member can be matched in phase with each other. According to this feature, the phase matching can be further easily and conveniently accomplished.

According to another aspect of the present invention, there is also provided a method of magnetizing a ring-shaped to-be-detected member of a rotation sensor unit, using a magnetizing yoke assembly of a structure having a pair of yoke arms having respective end faces curved arcuately with a space left between those end faces. This magnetizing method includes positioning the to-be-detected member with a ring center thereof aligned with an imaginary line connecting between respective centers of curvature of the curved end faces of the yoke arms, fixing the to-be-detected member with opposite sides of the to-be-detected member spaced an equal distance from the adjacent free end faces, and magnetizing the to-be-detected member.

If the yoke arms of the magnetizing yoke assembly have an arcuately curved end faces, the to-be-detected member can be precisely magnetized to have a magnetic intensity distribution representing a sinusoidal waveform.

Preferably, the magnetizing yoke assembly may be of a symmetrical shape not only in a first direction, in which the curved end faces confront with each other, but also in a second direction transverse to such first direction, with respect to the ring center of the to-be-detected member. In such case, the magnetic loop of the yoke assembly can have a good balance and, therefore, the to-be-detected member can have a magnetic characteristic representing as closely a sinusoidal waveform as possible.

In a preferred embodiment of the present invention, each of the curved end faces of the yoke arms may have a radius $R_y$ of curvature, which is larger than a radius $R_e$ of the to-bedetected member and is within the range of 2×Re≦Ry≦3× Re. Also, so long as the to-be-detected member is magnetized to have a single pole pair, each of the yoke arms of the magnetizing yoke assembly may have a width greater than the maximum diameter of the to-be-detected member. Where the yoke assembly of this shape is employed, it is possible to magnetize the to-be-detected member to have a magnetic characteristic representing as closely a sinusoidal waveform as possible.

The magnetizing yoke assembly may include coil windings wound around the respective yoke arms at a location adjacent the curved end faces, respectively. If the coil windings are wound round the respective yoke arms at the specific location adjacent the curved end faces thereof, the magnetizing intensity can advantageously be increased.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

A combined sensor and bearing assembly according to a first preferred embodiment of the present invention will now be described with particular reference to FIGS. 1 to 6. The combined sensor and bearing assembly identified by 1 includes a rolling bearing unit 22 and a rotation sensor unit 23 integrated into the rolling bearing unit 22. The rolling bearing unit 22 includes a rotatable raceway member 2 having at least one inner raceway 2a defined in an outer peripheral surface thereof, a non-rotatable or stationary raceway member 3 having an outer raceway 3a defined in an inner peripheral surface thereof and positioned around the rotatable raceway member 2 with an annular bearing space defined between it and the rotatable raceway member 2, and a circular row of rolling elements 4 rollingly accommodated within the annular bearing space and received in part within the inner raceway 2a and in part within the outer raceway 3a.

Figure 1:
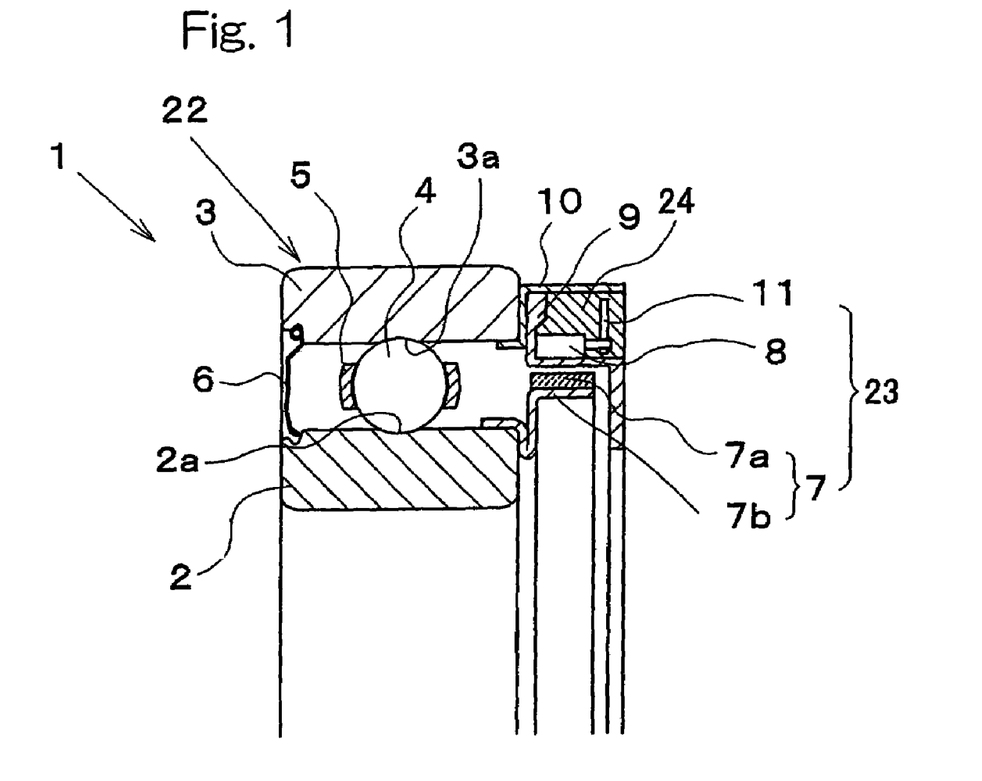
FIG. 1 is a longitudinal sectional view of a combined sensor and bearing assembly according to a first preferred embodiment of the present invention.

The rotation sensor unit 23 is disposed at one of opposite ends, for example, a right end, of the rolling bearing unit 22 and includes a generally tubular to-be-detected member 7 carried by a right end of the rotatable raceway member 2, a magnetic detector 8 fixedly connected to a right end of the stationary raceway member 3 in face-to-face relation with the to-be-detected member 7, and a circuit board 11.

The magnetic detector 8 is a magnetic sensor in the form of, for example, a Hall element, a Hall integrated circuit (Hall IC) or an MR element. The circuit board 11 is used to support the magnetic detector 8 thereon and, through this circuit board 11, sensor signals are interfaced between the magnetic detector 8 and an external circuit component or electric appliance. It is, however, to be noted that the use of the circuit board 11 may be dispensed with if a circuit wiring is connected directly with a lead line of the magnetic sensor 8. The magnetic detector 8 is inserted into a resinous casing 9, which is in turn filled with a resinous material 24 to provide a resin-molded detector, which casing 9 is fixed to the stationary raceway member 3 through a metallic casing 10.

The rolling bearing unit 22 may be in the form of a deep groove ball bearing, in which case the rotatable raceway member 2 is represented by an inner race and the stationary raceway member 3 is represented by an outer race. The rolling elements 4, that is, balls are operatively retained by a ball retainer or cage 5 in a circular row. The annular bearing space between the rotatable raceway member 2 and the stationary raceway member 3 is sealed at one end by a sealing member 6 positioned at a location remote from the rotation sensor unit 23.

The to-be-detected member 7 is of a radial type confronting the magnetic detector 8 in a radial direction of the bearing unit 22 and is in the form of an annular component part having a magnetic characteristic relative to the magnetic detector 8 that varies continuously in a direction circumferentially thereof. The magnetic characteristic of this to-be-detected member 7 changes one or more cycles for each complete rotation of the rotatable raceway member 2. More specifically, the to-be-detected member 7 includes an annular backing metal 7b fixedly mounted on the rotatable raceway member 2, and an annular magnetic element 7a fixedly mounted on the annular backing metal 7b so as to confront the magnetic detector 8 and having one pole pair, or a plurality of pole pairs each including one N-pole and one S-pole, so magnetized thereto as to alternate with each other in a direction circumferentially thereof.

As hereinabove described, the to-be-detected member 7 is fixed to the rotatable raceway member 2 through the backing metal 7b. However, the annular magnetic element 7a may be in the form of a rubber magnet and is bonded by vulcanization to the annular backing metal 7b. Where the rubber magnet is employed for the magnetic element 7a, a powdery magnetic material to be mixed together with a rubber material is generally employed in the form of a ferrite material or a rare earth material. Other than the rubber magnet, this magnetic element 7a may also be employed in the form of a plastic magnet or a sintered magnet, in which case the use of the backing metal may not be always necessary.

Figure 2A:
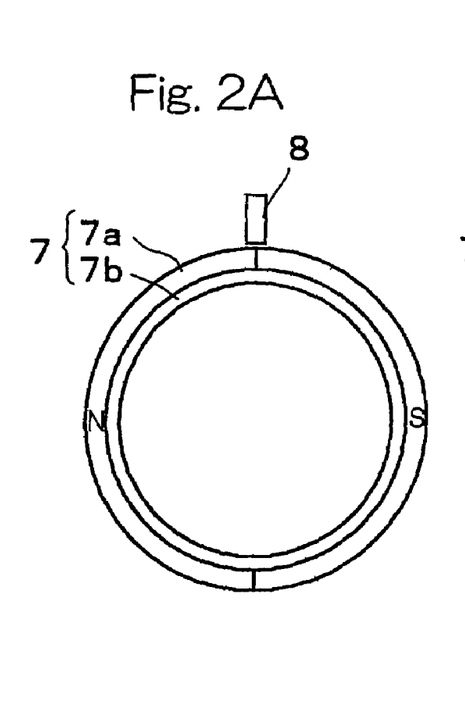
FIG. 2A is an end view showing a rotation sensor employable in the combined sensor and bearing assembly shown in FIG. 1, respectively.
Figure 2B:
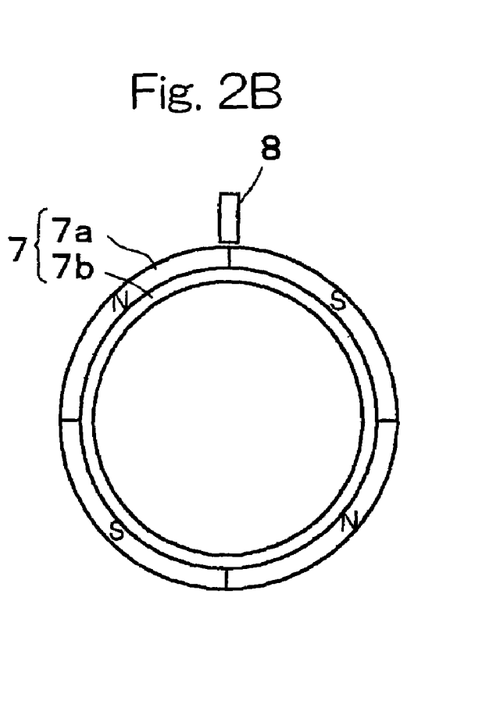
FIG. 2B is an end view showing a different rotation sensor employable in the combined sensor and bearing assembly shown in FIG. 1, respectively.

FIGS. 2A and 2B illustrate two examples of the magnetic element 7a of the to-be-detected member 7, respectively, which differ from each other in respect of the number of the pole pairs. In particular, the magnetic element 7a shown in FIG. 2A has one pole pair magnetized thereto, whereas the magnetic element 7a shown in FIG. 2B has two pole pairs magnetized thereto. The number of the pole pairs varies depending on the range of angle that is detected by the rotation sensor unit 23. The magnetic detector 8 is in the form of a single magnetic sensor capable of generating an output signal proportional to the density of magnetic fluxes. This magnetic sensor is of a type capable of providing an analog signal and may be employed in the form of, for example, a Hall element or a Hall IC of an analog output type. This magnetic detector 8 is positioned radially outwardly of the to-be-detected member 7 so as to confront the to-be-detected member 7 with a predetermined gap left between it and the to-be-detected member 7.

Figure 3:
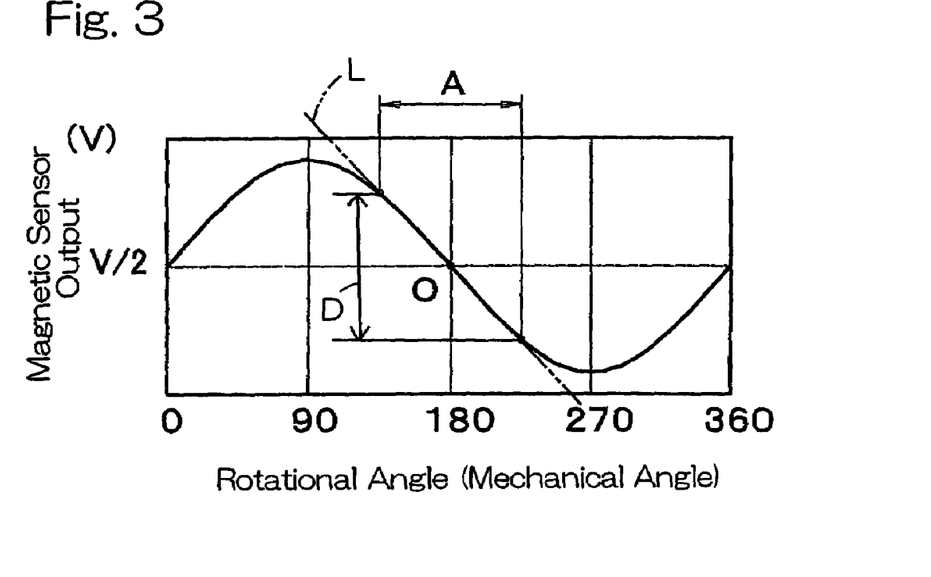
FIG. 3 is a chart showing the waveform of an output from the rotation sensor shown in FIG. 2A.

FIG. 3 illustrates the waveform of a detection signal outputted from the magnetic detector 8 during rotation of the rotatable raceway member 2, particularly where the magnetic element 7a of the to-be-detected member 7 has only one pole pair as shown in FIG. 2A. In this case, during one complete rotation of the rotatable raceway member 2, the detection signal in the form of sinusoidal wave of one cycle can be obtained. On the other hand, where a Hall IC of an analog output type is employed for the magnetic detector 8, the output voltage representing the detection signal will change sinusoidally with respect to the half value (V/2) of an electric power source voltage V thereof.

The range in which the detection signal (the output voltage) changes substantially linearly covers output portions leftwards and rightwards of the zero point O at which the output voltage is V/2. In the illustrated instance, the absolute position of the raceway member 2 can be detected if the range in which the substantially linear change of the detection signal takes place, when expressed in terms of mechanical angle, covers 180° output range between the 90° position to the 270° position of the raceway member 2. If more accurate linearity of the detection signal is required within the 180° output range between the 90° position to the 270° position, the angle of rotation of the raceway member 2 should be limited to a range A in which the detection signal exhibits a linear characteristic. Within such range A of angle of rotation so limited, the precise absolute position can be detected based on the output linearity exhibited within the limited range A. It is, however, to be noted that other than that described above, the range in which the output linearity of the detection signal can be obtained within the angle of rotation with respect to the mechanical angle taken at 0° can be employed.

It is to be noted that the term "range A, in which the detection signal represents a linear characteristic" is intended to speak of the range at which, with respect to the imaginary straight line L connecting between respective levels of the detection signal at both ends of the range A, the deviation of the detection signal from the imaginary straight line L is not higher than 5%, preferably not higher than 4% and more preferably not higher than 3% of the level difference D between the detection signals at the both ends of the range A.

Figure 4:
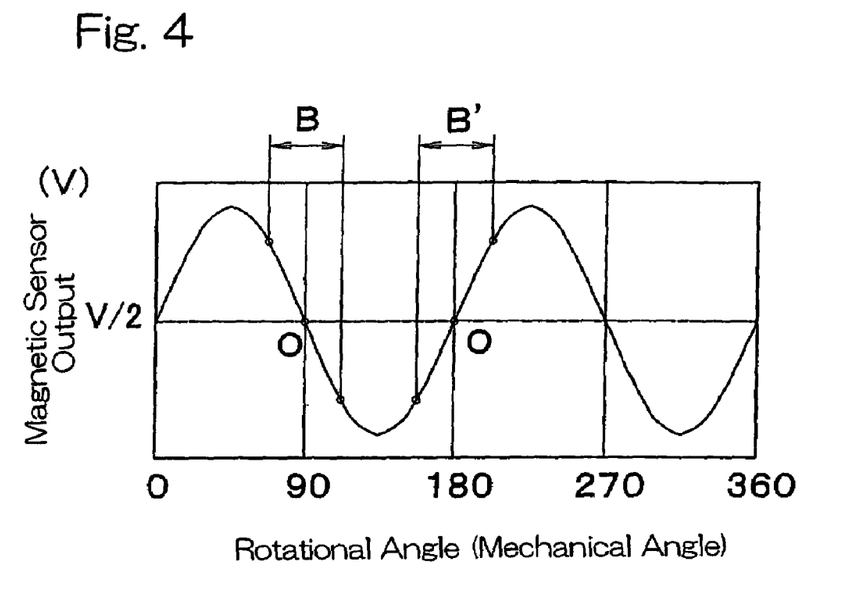
FIG. 4 is a chart showing the waveform of an output from the rotation sensor shown in FIG. 2B.

FIG. 4 illustrates the waveform of the detection signal outputted from the magnetic detector 8 during rotation of the rotatable raceway member 2, particularly where the magnetic element 7a of the to-be-detected member 7 has two pole pairs as shown in FIG. 2B. In this case, during one complete rotation of the rotatable raceway member 2, the detection signal in the form of sinusoidal wave of two cycles can be obtained. In this instance, if the range in which the output linearity can be obtained, when expressed in terms of mechanical angle, covers 90° output range between leftwards and rightwards of the zero point, the absolute position of the raceway member 2 can be detected. If more accurate linearity of the output voltage (the detection signal) is required, the angle of rotation of the raceway member 2 should be limited to a range B in which the detection signal exhibits a linear characteristic. In such case, the range B', which is different from the range B in respect of the inclination of the output waveform, may be employed. In this way, if the number of the pole pairs of the to-be-detected member 7 is increased, the accuracy of detection of the rotation angle can be increased though the range of the angle of rotation, at which the absolute position can be detected, narrows correspondingly.

Figure 5:
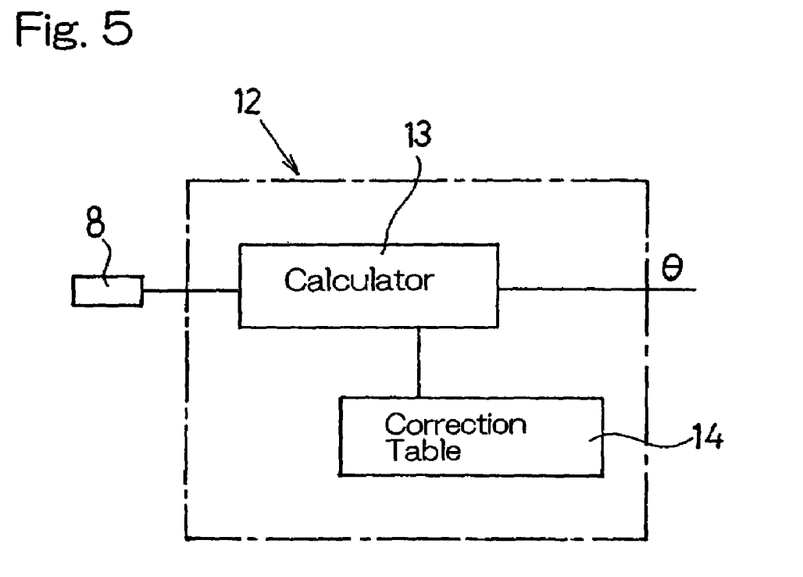
FIG. 5 is a circuit block diagram showing an example of a processing unit for calculating the absolute position of the angle of rotation based on an output signal from a magnetic detector.

FIG. 5 illustrates an example of a processing unit 12 for calculating the absolute position of the angle of rotation based on the detection signal obtained from the magnetic detector 8. This processing unit 12 is built in the combined sensor and bearing assembly 1 in the form as, for example, mounted on the circuit board 11, but this processing unit 12 may be mounted on a substrate (not shown) or the like disposed outside the bearing assembly.

In this processing unit 12, the analog signal outputted from the magnetic detector 8 is, after having been converted into a digital signal by an analog-to-digital converter built in a calculator 13, used to calculate the absolute position θ of the angle of rotation with reference to a correction table 14 in which relations between the sensor output and the absolute position are preset.

Figure 6:
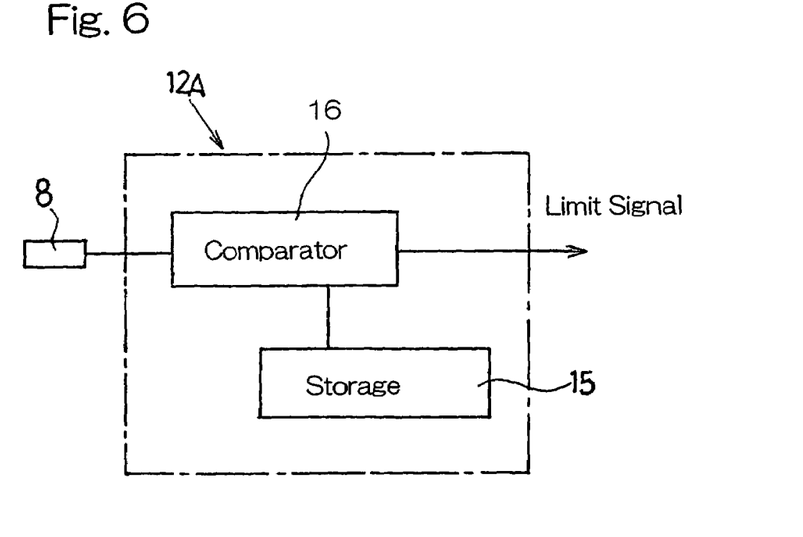
FIG. 6 is a circuit block diagram showing an example of a processing unit for providing a limit signal used to ascertain, based on an output signal from the magnetic detector, whether or not the possible range of rotation is departed.

FIG. 6 illustrates an example of a processing unit 12A for providing a limit signal used to ascertain, based on the detection signal from the magnetic detector 8, not the absolute position, whether the rotatable raceway member 2 has departed from the range over which such rotatable raceway member 2 can rotate. In this processing unit 12A, the analog signal outputted form the magnetic detector 8 is, after having been converted into an digital signal by an analog-to-digital converter built in a comparator 16, used to cause a storage 15, in which relations between the sensor output and the possible range of rotation of the raceway member 2 are preset, to output a limit signal. Although in FIG. 6, the detection signal is processed after it has been converted into the digital signal, it may be processed without being converted into the digital signal.

It is to be noted that as a circuit structure of each of the processing units 12 and 12A shown respectively in FIGS. 5 and 6, one-chip microcomputer having an analog-to-digital converter and a memory built therein can be employed, in which case the circuit structure can advantageously be simplified.

With the combined sensor and bearing assembly 1 of the structure hereinabove described, only the range in which the magnetic characteristic of the to-be-detected member 7 relative to the magnetic detector 8 exhibits an output linearity is utilized for the detection of the angle of rotation and, accordingly, the absolute position of the angle of rotation can be detected accurately within the limited range of angle. Since the present invention requires no use of two magnetic detectors 8 for the detection of the absolute position, the combined sensor and bearing assembly 1 can be manufactured and assembled compact in size. Also, since the to-be-detected member 7 and the magnetic detector 8 are mounted on the rotatable and stationary raceway members 2 and 3 of the rolling bearing unit 22, the gap between the to-be-detected member 7 and the magnetic detector 8 can be kept uniform in gap size with the detection output stabilized consequently, resulting in facilitation of incorporation of the combined sensor and bearing assembly 1 into the appliance. Also, the combined sensor and bearing assembly 1 can be designed to function as a sort of a non-contact potentiometer.

Also, since the to-be-detected member 7 employed in the form of the magnet has a magnetic characteristic that change one or more cycles for each complete rotation of the rotatable raceway member 2, the range in which the magnetic characteristic of the to-be-detected member 7 exhibits linearity lies within 180° of the angle of rotation and, hence, the sensitivity of detection can increase.

Figure 7:
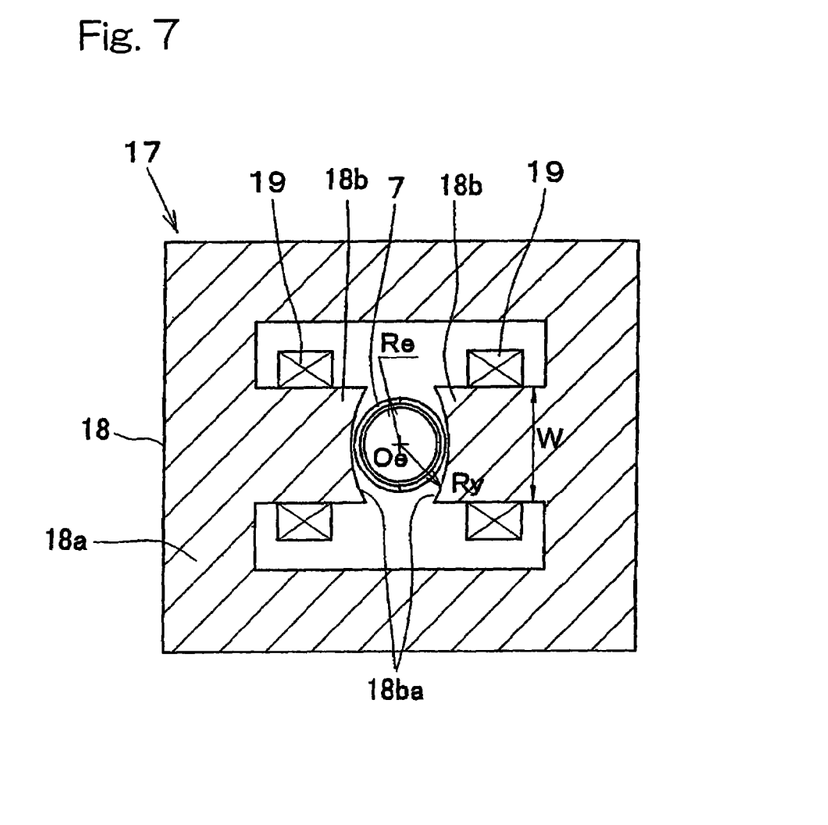
FIG. 7 is a schematic sectional representation used to illustrate a method of magnetizing a to-be-detected member of the rotation sensor shown in FIG. 2A.

Hereinafter, the manner of magnetization of the to-be-detected member 7 will be described. FIG. 7 schematically illustrates a magnetizing yoke assembly 17 used to magnetize the magnetic element 7a of the to-be-detected member 7 so as to render the magnetic characteristic of the element 7a to represent a sinusoidal waveform as much as possible.

Referring to FIG. 7, the magnetizing yoke assembly 17 is of a design capable of magnetizing the magnetic element 7a to have one pole pair consisting of one N-pole and one S-pole as shown in FIG. 2A and includes a yoke 18 and a pair of exciting coil windings 19. The yoke 18 is made of a ferrous magnetic material and has a generally rectangular circumferential yoke portion 18a and a pair of yoke arms 18b protruding inwardly from opposite sides of the circumferential yoke portion 18a in face-to-face relation. The exciting coil windings 19 are wound around the respective yoke arms 18b.

A tubular magnetizable member, which when magnetized as will be described subsequently forms the to-be-detected member 7, is positioned in a space between the yoke arms 18b of the yoke 18 when it is to be magnetized. The yoke arms 18b have their respective free end faces 18ba that are concavely curved to have an arcuate surface. The tubular magnetizable member is positioned within the space between the yoke arms 18b with the center Oe of the tubular magnetizable member aligned with the imaginary line connecting between respective centers of curvature of the free end faces 18ba of the yoke arms 18b and, at the same time, with opposite sides of the magnetizable member spaced an equal distance from the adjacent free end faces 18ba of the yoke arms 18b.

The yoke 18 is so designed as to be symmetrical in all directions with respect to the center Oe of the magnetizable member, which eventually forms the to-be-detected member 7, so that the resultant magnetic loop of the yoke assembly 17 can have a good balance. In other words, the yoke 18 of the magnetizing yoke assembly 17 is of a symmetrical shape not only in a horizontal direction, in which the end faces 18ba confront with each other, but also in a direction transverse to such horizontal direction, with respect to the center Oe of the tubular magnetizable member.

The radius Ry of curvature of each of the arm end faces 18ba is so chosen as to be larger than the radius Re of curvature of the tubular magnetizable member, which eventually forms the to-be-detected member 7, and as to be within the following range:

$$2 \times Re \leq Ry \leq 3 \times Re$$

Each of the yoke arms 18b has a width W so chosen as to be greater than the maximum diameter (outer diameter) of the tubular magnetizable member, so that the magnetic element 7a of the to-be-detected member 7 can be magnetized to have a magnetic characteristic of substantially sinusoidal waveform.

The exciting coil windings 19 are wound around the respective yoke arms 18b at a location adjacent the free end faces 18ba thereof, so that the intensity of magnetization can be increased.

It is to be noted that although in the foregoing instance the yoke structure has been shown and described as capable of magnetizing all at once, the shape of the respective free ends of the yoke arms 18b can be equally applied to an index magnetization, that is, to the mode of magnetization in which while the tubular magnetizable member, which eventually forms the to-be-detected member 7, is indexed, the tubular magnetizable member is magnetized on piecemeal basis.

Material for the magnetic element 7a of the to-be-detected member 7 may be either an isotropic magnet or an anisotropic magnet, but the use of an isotropic magnet is preferred where it is sinusoidally magnetized in the manner described hereinbefore. In this way, the distribution of magnetic fields of the magnetic element 7a can be continuously uniform with a minimized noise.

Figure 8:
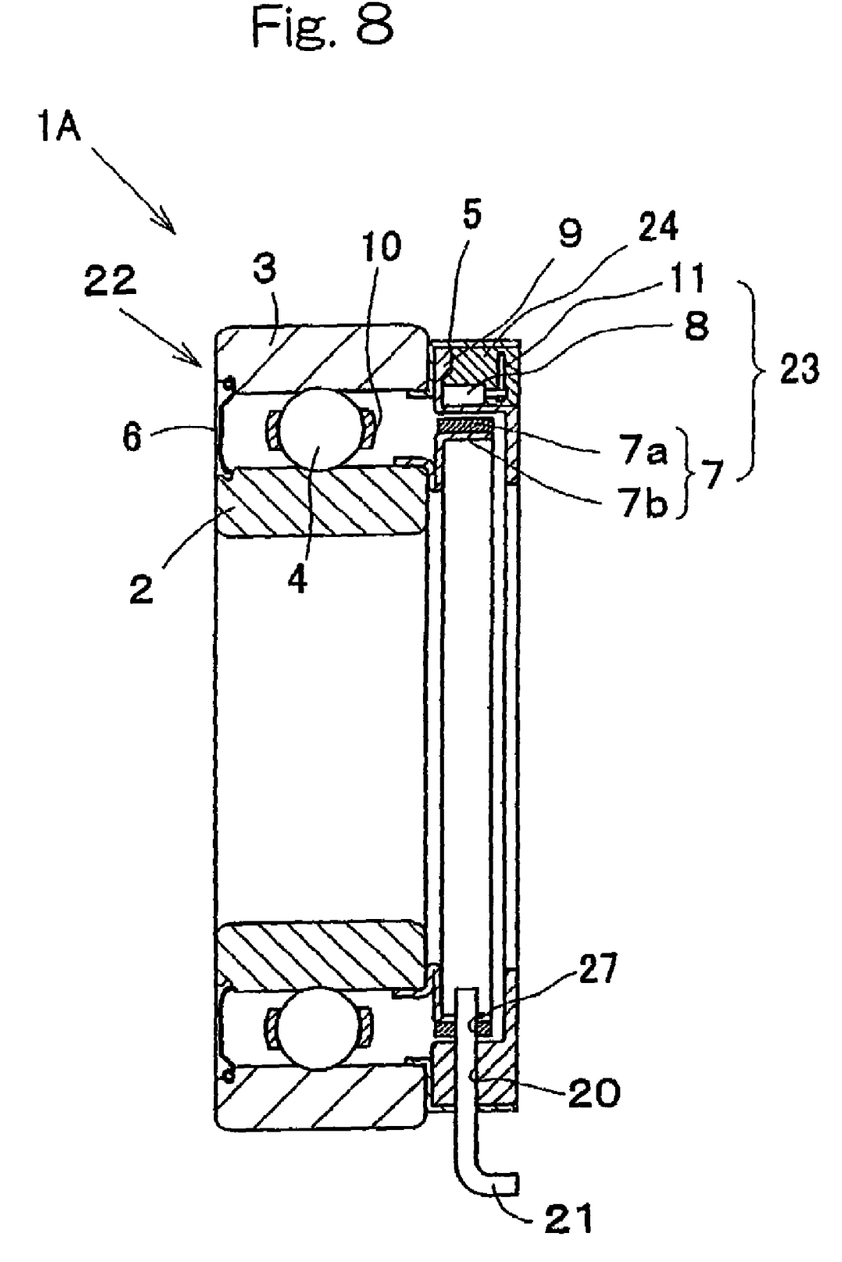
FIG. 8 is a longitudinal sectional view of the combined sensor and bearing assembly according to a second preferred embodiment of the present invention.

FIG. 8 illustrates the combined sensor and bearing assembly 1A according to a second preferred embodiment of the present invention. The combined sensor and bearing assembly 1A shown therein is substantially similar to that of the foregoing embodiment shown in FIGS. 1 to 6, except that in this second embodiment of FIG. 8 an inner phase-alignment hole 27 is formed in the to-be-detected member 7 so as to extend completely thereacross in a radial direction of the combined sensor and bearing assembly 1A and an outer phase-alignment hole 20 is also formed in each of the resinous casing 9 and the metallic casing 10, both of which are used as respective member for fixedly supporting the magnetic detector 8, so as to extend completely thereacross in a radial direction of the combined sensor and bearing assembly 1A. It is to be noted that the term "a member enclosing the magnetic detector" referred to in the scope of claims of the present invention annexed hereto is intended to encompass both of the resinous casing 9 and the metallic casing 10.

The inner and outer phase-alignment holes 27 and 20 are a throughhole, i.e., a hole completely extending across a wall thickness of the relevant component part and are defined in a portion of the to-be-detected member 7 and portions of the resinous casing 9 and the metallic casing 10, respectively, which are spaced a predetermined distance angularly from the magnetic detector 8 in a direction circumferentially thereof. With the inner and outer phase-alignment holes 27 and 20 aligned with each other, the to-be-detected member 7 and the magnetic detector 8 can be set in a phase matched relation with each other so that the output signal from the magnetic detector 8 can be set at the zero point (Output voltage=V/2) shown in, for example, FIG. 3.

Prior to the combined sensor and bearing assembly 1A incorporated in a machine or equipment, a rod-like fixing jig 21 is kept inserted through the inner and outer phase-alignment holes 27 and 20 to lock the rotatable and stationary raceway members 2 and 3 in a position immovable relative to each other. Accordingly, the to-be-detected member 7 and the magnetic detector 8 can be kept in the phase matched relation with each other as hereinbefore described. In such case, with the to-be-detected member 7 and the magnetic detector 8 held in the phase matched relation, the inner phase-alignment hole 27 is defined in a portion of the to-be-detected member 7 that is angularly spaced a sufficient distance from the magnetic detector 8.

Other structural features of the combined sensor and bearing assembly 1A shown and described with reference to FIG. 8 are substantially similar to those of the combined sensor and bearing assembly 1 shown and described with reference to FIGS. 1 to 6 and, accordingly, the details thereof are not reiterated for the sake of brevity.

When the combined sensor and bearing assembly 1A is incorporated in a machine or equipment while the fixing jig 21 is kept inserted through the inner and outer phase-alignment holes 27 and 20, the attendant worker need not perform the phase alignment between the magnetic detector 8 and the to-be-detected member 7 making reference to the detection signal outputted form the magnetic detector 8 and, hence, a requisite adjustment job to be performed during the incorporation of the combined sensor and bearing assembly 1A in the machine or equipment can advantageously be facilitated. The fixing jig 21 is withdrawn out of the inner and outer phase-alignment holes 27 and 20 to release the to-be-detected member 7 and the magnetic detector 8 rotatable relative to each other, once the combined sensor and bearing assembly 1A has been incorporated in the machine or equipment.

Alternative to the complete removal of the fixing jig 21 out from the inner and outer phase-alignment holes 27 and 20, however, the fixing jig 21 may be fixed to a housing (not shown) or the like, which forms a mounting member for the combined sensor and bearing assembly 1A, once it has been withdrawn a slight distance sufficient to allow the fixing jig 21 to disengage from only the inner phase-alignment hole 27, but to allow it to remain engaged in the outer phase-alignment hole 20. In such case, the fixing jig 21 can be concurrently utilized as a detent means for locking the stationary raceway member 3 in an immovable position.

Also, since the inner phase-alignment hole 27 is, when held in the phase matched relation with the outer phase-alignment hole 20, positioned at a location spaced a sufficient angular distance from the magnetic detector 8, any influence on the detection of rotation due to the presence of the inner phase-alignment hole 27 can be negligible so long as the rotatable raceway member 2 rotates relative to the stationary raceway member 3 within the range in which it can rotate.

Figure 9A:
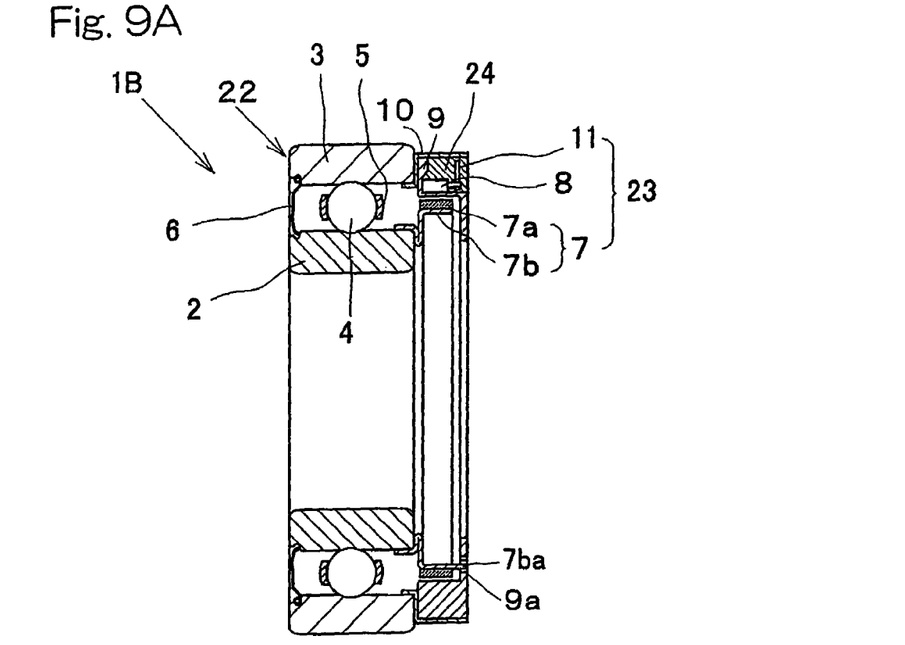
FIG. 9A is a longitudinal sectional view of the combined sensor and bearing assembly according to a third preferred embodiment of the present invention.
Figure 9B:
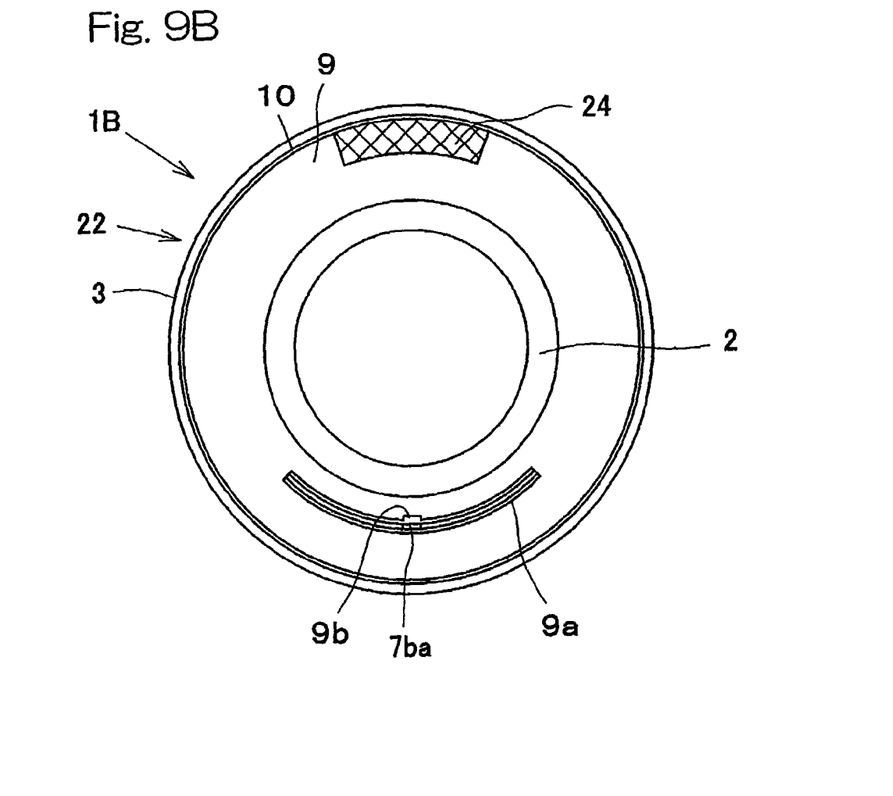
FIG. 9B is an end view of the combined sensor and bearing assembly according to the third preferred embodiment of the present invention.

FIGS. 9A and 9B illustrate the combined sensor and bearing assembly 1B according to a third preferred embodiment of the present invention. This combined sensor and bearing assembly 1B is substantially similar to the combined sensor and bearing assembly 1 of the first embodiment, except that in this third embodiment, a phase-alignment index 7ba is provided on a portion of the backing metal 7b of the to-be-detected member 7. The phase-alignment index 7ba may be in the form of a projection protruding in an axial direction of the combined sensor and bearing assembly 1B towards the outside of the bearing assembly 1B, for example, towards the right as viewed in FIG. 9A.

Cooperable with this phase-alignment index 7ba is an arcuately extending phase-alignment groove 9a defined in the resinous casing 9. This phase-alignment groove 9a may be in the form of either a slot or a through-hole and is coaxial with the to-be-detected member 7 while being positioned to avoid an undesirable interference with the phase-alignment index 7ba.

The phase-alignment index 7ba is aligned with a marking 9b, which may be in the form of a recess, formed in a portion of the phase-alignment groove 9a intermediate of the length thereof and, in this condition, the to-be-detected member 7 and the magnetic detector 8 can be set in a phase matched relation with each other so that the output signal from the magnetic detector 8 can be set at the zero point (Output voltage=V/2) shown in, for example, FIG. 3.

It is to be noted that the length of the arcuately extending phase-alignment groove 9a is so chosen as to be slightly greater than the range of angle, in which the rotation is detected, and as to avoid any undesirable interference with the rotation of the rotatable raceway member 2 within the range of angle in which the rotation is detected or within the range in which the rotatable raceway member 2 can rotate.

Other structural features of the combined sensor and bearing assembly 1A shown and described with reference to FIGS. 9A and 9B are substantially similar to those of the combined sensor and bearing assembly 1 shown and described with reference to FIGS. 1 to 6 and, accordingly, the details thereof are not reiterated for the sake of brevity.

Even with the combined sensor and bearing assembly 1B, the phase alignment between the magnetic detector 8 and the to-be-detected member 7, which takes place during the incorporation of the combined sensor and bearing assembly B in the machine or equipment, can advantageously be simplified as is the case with the second embodiment shown and described with reference to FIG. 8.

It is, however, to be noted that the marking 9b may be a colored marking or a dent and the phase-alignment index 7ba may be a recess or a colored marking. Even those alternatives can provide effects similar to those described hereinabove.

After the combined sensor and bearing assembly 1, 1A or 1B has been incorporated in the machine or equipment, data handling of the correction table 14 in the processing unit 12 or the storage 15 in the processing unit 12A, shown in FIGS. 5 and 6, respectively, is carried out, the result of which is fed back to the correction table 14 or the storage 15. In the illustrated instance, a memory such as one-chip microcomputer is employed as the correction table 14 or the storage 15, with actual measurement values inputted in this memory. Where the magnetic detector 8 has a function identical with that of this memory, the actual measurement values referred to above are written directly in the magnetic detector 8.

Although in the first to third embodiments the to-be-detected member 7 has been shown as a radial type, the to-be-detected member 7 may be an axial type in which the to-be-detected member 7 confronts the magnetic detector 8 in the axial direction of the combined sensor and bearing assembly. Also, in any one of the foregoing embodiments of the present invention, the to-be-detected member 7 has been shown and described as magnetized to represent a sinusoidal waveform. However, other than this, an air gap may be so formed between the to-be-detected member 7 and the magnetic detector 8 as to vary in gap size in a direction circumferentially thereof The present invention does not specifically limit the structure for varying the magnetic characteristic of the to-be-detected member 7 relative to the magnetic detector 8.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in describing any one of the foregoing embodiments of the present invention, the processing unit 12 or 12A has been described as mounted on the circuit board 11 or on the substrate external to the bearing assembly, the processing unit 12 or 12A in its entirety or in part may be disposed on an output cable (not shown).

Also, transmission of the sensor signals and supply of an electric power between the magnetic detector 8 and a sensor signal receiving unit positioned external to the combined sensor and bearing assembly may be carried out wireless.

Accordingly, such changes and modifications are, unless they depart from the scope of the present invention as delivered from the claims annexed hereto, to be construed as included therein.

What is claimed is:

1. A method of magnetizing a ring-shaped to-be-detected member of a rotation sensor unit, using a magnetizing yoke assembly of a structure having a pair of yoke arms having respective end faces curved arcuately with a space left between those end faces, the method comprising:

positioning the to-be-detected member with a ring center thereof aligned with an imaginary line connecting between respective centers of curvature of the curved end faces of the yoke arms;

fixing the to-be-detected member with opposite sides of the to-be-detected member spaced an equal distance from the adjacent free end faces; and magnetizing the to-be-detected member, wherein each of the curved end faces of the yoke arms has a radius Ry of curvature, which is larger than a radius Re of the to-be-detected member and is within the range of $2 \times Re \leqq Ry \leqq 3 \times Re$.

2. The method of magnetizing the to-be-detected member as claimed in claim 1, wherein the magnetizing yoke assembly is of a symmetrical shape in a first direction, in which the curved end faces confront with each other, and in a second direction transverse to the first direction, with respect to the ring center of the to-be-detected member.

3. The method of magnetizing the to-be-detected member as claimed in claim 1, wherein the magnetizing yoke assembly includes coil windings wound around the respective yoke arms at a location adjacent the curved end faces, respectively.

* * * * *

UNITED STATES PATENT AND TRADEMARK OFFICE
CERTIFICATE OF CORRECTION

| | | |
|---|---|---|
| PATENT NO. | : 7,501,812 B2 | Page 1 of 1 |
| APPLICATION NO. | : 11/976618 | |
| DATED | : March 10, 2009 | |
| INVENTOR(S) | : Takashi Koike et al. | |

It is certified that error appears in the above-identified patent and that said Letters Patent is hereby corrected as shown below:

Column 1, Line 12, change "2004-0983668" to --2004-098368--.

Signed and Sealed this

Twenty-sixth Day of May, 2009

JOHN DOLL
*Acting Director of the United States Patent and Trademark Office*